United States Patent
Van De Ven et al.

(10) Patent No.: US 9,183,391 B2
(45) Date of Patent: Nov. 10, 2015

(54) MANAGING DEVICE DRIVER CROSS RING ACCESSES

(71) Applicants: Adriaan Van De Ven, Portland, OR (US); Baiju V. Patel, Portland, OR (US)

(72) Inventors: Adriaan Van De Ven, Portland, OR (US); Baiju V. Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 13/997,790

(22) PCT Filed: Mar. 13, 2013

(86) PCT No.: PCT/US2013/030742
§ 371 (c)(1),
(2) Date: Jun. 25, 2013

(87) PCT Pub. No.: WO2014/142817
PCT Pub. Date: Sep. 18, 2014

(65) Prior Publication Data
US 2015/0007318 A1    Jan. 1, 2015

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/56 | (2013.01) |

(52) U.S. Cl.
CPC ............ *G06F 21/56* (2013.01); *G06F 12/1491* (2013.01); *G06F 2212/1052* (2013.01)

(58) Field of Classification Search
CPC .................................................. G06F 12/1491
USPC ........................................................... 726/23
See application file for complete search history.

(56) References Cited

U.S. PATENT DOCUMENTS

| | | | |
|---|---|---|---|
| 8,397,306 B1 | 3/2013 | Tormasov | |
| 2005/0278535 A1* | 12/2005 | Fortune et al. | 713/176 |
| 2008/0184373 A1 | 7/2008 | Traut et al. | |
| 2008/0313417 A1* | 12/2008 | Kim et al. | 711/163 |
| 2010/0043072 A1 | 2/2010 | Rothwell | |

(Continued)

FOREIGN PATENT DOCUMENTS

WO    2013101059 A1    7/2013

OTHER PUBLICATIONS

International Search Report and Written Opinion Received for PCT Patent Application No. PCT/US2013/0303742, mailed on Dec. 9, 2013, 14 pages.

*Primary Examiner* — Andrew Nalven
*Assistant Examiner* — Khang Do
(74) *Attorney, Agent, or Firm* — Barnes & Thornburg LLP (57) ABSTRACT

Technologies managing cross ring memory accesses by a device driver on a computing device includes configuring a memory page table associated with the device driver to disable cross ring memory accesses by the device driver, trapping attempted cross ring memory accesses by the device driver, and denying the attempted cross ring memory access if the device driver is determined to be malicious. If the device driver is determined not to be malicious, the memory page table is updated to allow the attempted cross ring memory access. The device driver may be analyzed to determine whether the device driver is malicious by comparing the device driver and the attempted cross ring memory access to security data, such as a device driver fingerprint and/or cross ring memory access heuristics, stored on the computing device.

27 Claims, 5 Drawing Sheets

(56) References Cited

U.S. PATENT DOCUMENTS

2010/0082926 A1* 4/2010 Sahita et al. ............... 711/163
2010/0095081 A1* 4/2010 McDavitt et al. ........... 711/171
2012/0047580 A1 2/2012 Smith et al.
2012/0166767 A1 6/2012 Patel et al.
2012/0255018 A1* 10/2012 Sallam ....................... 726/24
2013/0159596 A1 6/2013 van de Ven et al.

* cited by examiner

MANAGING DEVICE DRIVER CROSS RING ACCESSES

BACKGROUND

Many computer architectures implement some form of hierarchical protection domains or "rings." Each protection ring has an associated privilege mode (i.e., from a high-privilege mode to a low-privilege mode). The operating system of a computing device, for example, is generally executed in the highest-privileged mode. In software vernacular, the protection ring with the highest privilege is often referred to as "Ring 0" or kernel-mode, with lower privilege rings being assigned increasing numbers (e.g. Ring 1, Ring 2, Ring 3, etc.). Although a particular computer architecture or operating system may utilize any number of protection rings, some computer architectures or operating systems utilize a reduced protection ring scheme having only a few protection rings (e.g. only Ring 0 and Ring 3). The use of protection domains or rings allow the corresponding computer system to provide protection of data and applications executed in each protection ring from those executed in other protection rings. For example, in some computer systems, cross ring accesses (e.g. a Ring 0-to-Ring 3 access) may be restricted or even prohibited.

Device drivers are software programs that control a particular device of a computing system. Device drivers act as an interface between an operating system of the computing system, or application executed by the operating system, and the corresponding hardware device. In many computing systems, device drivers are executed in a high-privileged protection ring such as Ring 0, along with the operating system. Software applications, on the other hand, are executed in a lower privileged ring, such as Ring 3. Many legitimate device drivers perform cross ring accesses (e.g. a Ring 0-to-Ring 3 access) during execution. Some operating systems facilitate the cross ring accesses by providing a specific application interface program (API), which must be used by the device drive to perform the cross ring access without causing a violation. However, many device drivers may not implement such APIs or otherwise be configured to perform the cross ring accesses in a secure manner. As such, to function properly, computer systems generally must allow all device drivers to run without any cross ring access protection or globally enforce cross ring access protection, which causes legacy device drivers to stop functioning properly. As such, the ability to provide cross ring access protection for memory accesses from a higher protection ring to a lower protection ring in a typical computer system using various device devices is limited.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment." "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
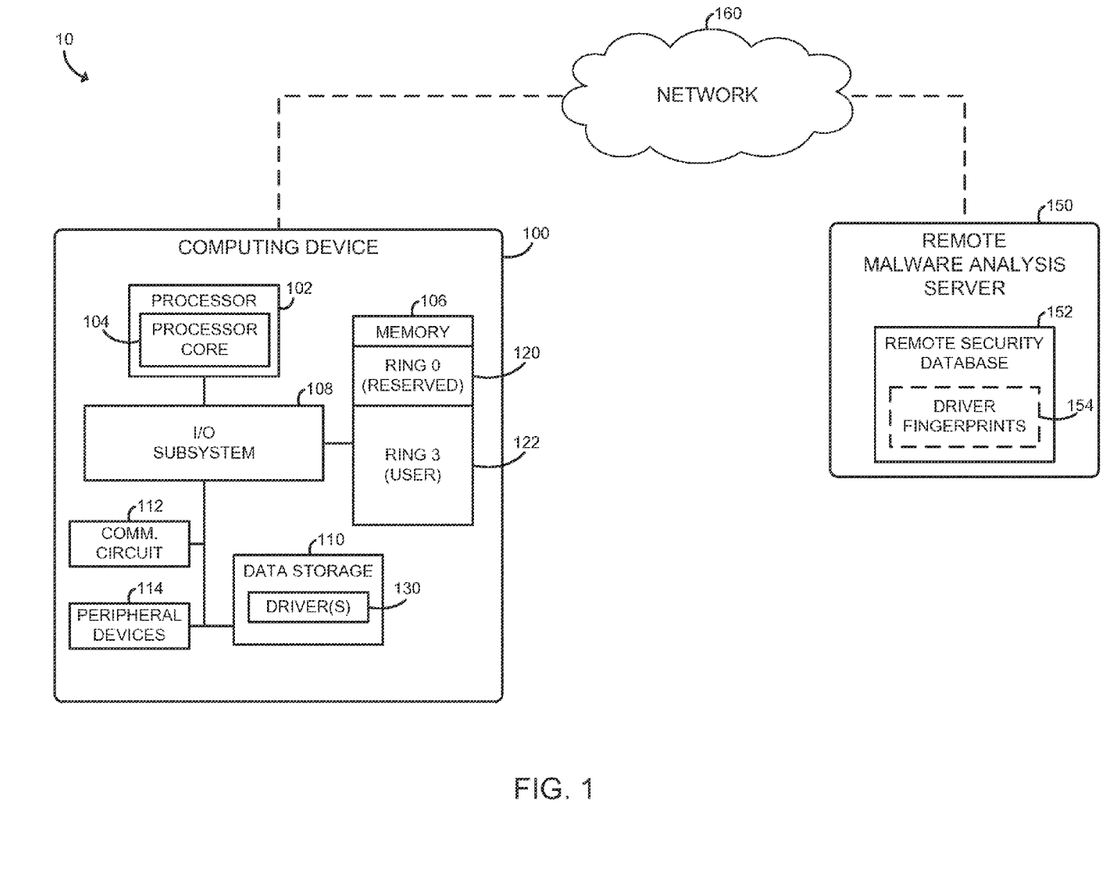
FIG. 1 is a simplified block diagram of at least one embodiment of a system for managing device driver(s) cross ring memory accesses on a computing device.

Referring now to FIG. 1, in the illustrative embodiment, a system 10 for managing cross ring memory accesses includes a computing device 100, a remote malware analysis server 150, and a network 160 over which the computing device 100 and the remote malware analysis server 150 communicate. The computing device 100 is configured to monitor and manage cross ring memory accesses (e.g., a high privilege-to-low privilege memory access) performed by device drivers executed on the computing device 100. To do so, as discussed in more detail below, a memory page table associated with each device driver is configured to disable cross ring memory accesses by the corresponding device driver. That is, each device driver is incapable of accessing memory locations belonging to a protection ring (e.g., protection Ring 3) other than the protection ring to which the device driver belongs (e.g. protection Ring 0) without causing an exception or error. Any cross ring memory access is intercepted or trapped and the calling device driver, and the cross ring memory access itself, is analyzed to determine whether the device driver is malicious. If so, the attempted cross ring memory access is denied and the device driver may be aborted. If, however, the device driver is determined not to be malicious, the memory page table associated with the calling device driver is updated to allow cross ring memory accesses. Additionally, information regarding the calling device driver and/or the cross ring memory access may be provided to the remote malware analysis server 150, which may collect information from other computing devices to develop or update a global profile or "driver fingerprint" for the calling device driver as discussed in more detail below. In this way, legacy device drivers may be executed and managed on the computing device 100 in a secure manner and without the necessity of allowing or disallowing all cross ring memory accesses for all device drivers.

The computing device 100 may be embodied as any type of computing device capable of performing the functions described herein. For example, in some embodiments, the computing device 100 may be embodied as a desktop computer, a laptop computer, a tablet computer, a "smart" phone, a mobile media device, a game console, a mobile internet device (MID), a personal digital assistant, a "smart" appliance, or other computer and/or computing device. As shown in FIG. 1, the computing device 100 includes a processor 102, a memory 106, an input/output subsystem 108, a data storage 110, and a communication circuit 112. Of course, the computing device 100 may include other or additional components, such as those commonly found in a computer and/or computing device (e.g. various input/output devices), in other embodiments. Additionally, in some embodiments, one or more of the illustrative components may be incorporated in, or otherwise from a portion of, another component. For example, the memory 106, or portions thereof, may be incorporated in the processor 102 in some embodiments.

The processor 102 may be embodied as any type of processor capable of performing the functions described herein. For example, the processor may be embodied as a single or multi-core processor(s) having one or more processor cores 104, a digital signal processor, a microcontroller, or other processor or processing/controlling circuit. Similarly, the memory 106 may be embodied as any type of volatile or non-volatile memory or data storage currently known or developed in the future and capable of performing the functions described herein. In operation, the memory 106 may store various data and software used during operation of the mobile computing device 100 such as operating systems, applications, programs, libraries, and drivers. In the illustrative embodiment, the memory 106 is partitioned into multiple memory regions. Each memory region may be assigned to a different protection domain or ring with corresponding privileges. For example, in the illustrative embodiment, the memory 106 includes a high-privilege memory region 120 (e.g., kernel memory) assigned to protection Ring 0 and a low-privilege memory region 122 (e.g., user memory) assigned to protection Ring 3. Generally, any operating system and device drivers of the computing device 100 will be executed in the protection Ring 0 and reside in the corresponding Ring 0 memory region 120, and any user applications and data will be executed in the protection Ring 3 and reside in the corresponding Ring 3 memory region 122. Of course, although the illustrative computing device 100 is configured to have two protection rings and corresponding ring memory regions, the computing device 100 may include additional protection rings and corresponding ring memory regions in other embodiments. In this way, the computing device 100 may include multiple layers of privilege.

The memory 106 is communicatively coupled to the processor 102 via the I/O subsystem 108, which may be embodied as circuitry and/or components to facilitate input/output operations with the processor 102, the memory 106, and other components of the computing device 100. For example, the I/O subsystem 108 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 108 may form a portion of a system-on-a-chip (SoC) and be incorporated, along with the processor 102, the memory 106, and other components of the computing device 100, on a single integrated circuit chip.

The data storage 110 may be embodied as any type of device or devices configured for the short-term or long-term storage of data such as, for example, memory devices and circuits, memory cards, hard disk drives, solid-state drives, or other data storage devices. In the illustrative embodiment, the computing device 100 may store one or more device drivers 130 in the data storage 110. Each device driver 130 may be embodied as one or more software programs or other executable code configured to control a component or circuit of the computing device 100. For example, the device drivers 130 may include a device driver for the data storage 110, a device driver for the communication circuit 112, a device driver for an integrated audio chip or circuit of the I/O subsystem 108, and/or other device drivers for any other component, device, or circuit of the computing device 100. As with typical device drivers, each device driver 130 may act as a software interface between the operating system of the computing device 100 and the corresponding hardware component, device, or circuit.

The communication circuit 112 may be embodied as one or more devices and/or circuitry for enabling communications between the computing device 100 and the remote malware analysis server 150 over the network 160. The communication circuit 112 may be configured to use any one or more communication technology (e.g., wireless or wired communications) and associated protocols (e.g. Ethernet, Bluetooth®, Wi-Fi®, WiMAX, etc.) to effect such communication.

Additionally, in some embodiments, the computing device 100 may further include one or more peripheral devices 114. Such peripheral devices 114 may include any type of peripheral device commonly found in a computing device such as speakers, a hardware keyboard, input/output devices, peripheral communication devices, and/or other peripheral devices.

The remote malware analysis server 150 may be embodied as any type of server computing device, or collection of devices, capable of performing the functions described herein. The remote malware analysis server 150 may include components and devices commonly found in a server computer including, for example, a processor, I/O subsystem, memory, data storage, and communication circuitry. Such components may be similar to the corresponding components of the mobile computing device 100, the description of which is applicable to the corresponding components of the remote malware analysis server 150 and is not repeated herein so as not to obscure the present disclosure.

The remote malware analysis server 150 maintains a remote security database 152, which may include aggregated an/or non-aggregated data. For example, the remote malware analysis server 150 may aggregate security data from the computing device 100 and other computing devices of the system 10. For example, each computing device 100 of the system 10 is configured to transmit periodically, occasionally, or responsively the security data to the remote malware analysis server 150. Additionally, the remote security database 152 may include non-aggregated data such as pre-loaded driver fingerprints, driver fingerprints obtained from the cloud or other remote sources, and so forth.

The security data may be embodied as any type of security data related to the device drivers 130 and/or cross ring memory accesses attempted by the device driver 130 and useful in determining whether a device driver 130 is malicious. For example, in some embodiments, the security data may include the device driver 130 attempting to perform the cross ring memory access, data related to the device driver 130 such as the origination address of the device driver 130 from which the attempted cross ring memory access originated, and/or data related to the attempted cross ring memory access such as the destination address in the other protection ring that the device driver 130 attempted to access via the cross ring memory access. The remote malware analysis server 150 collects such information and builds a device driver profile or "driver fingerprint" 154 for each reported device driver 130. The driver fingerprint 154 may be embodied as any type of data usable to determine whether a device driver 130 is malicious (e.g., behaving in an expected manner). For example, in some embodiments, the driver fingerprint 154 may be embodied as a bit mask of the device driver 130 program, which is usable to determine whether the device driver 130 has been modified from the allowed version by comparing the bit mask to the device driver code. Additionally or alternatively, the driver fingerprint 154 may identify addresses of the device driver 130 from which allowed cross ring memory accesses originate and/or destination address of such allowed cross ring memory accesses. In this way, the driver fingerprint 154 may be used to analyze the device driver 130 itself, as well as, the behavior of the device driver 130 to determine whether it is malicious or not.

The remote malware analysis server 150 may update periodically or occasionally each computing device 100 of the system 10 with the latest copy of the driver fingerprints 154. As such, each computing device 100 may perform a local malware analysis of the device drivers 130 using the driver fingerprints 154 as discussed below. Additionally or alternatively, in some embodiments, the remote malware analysis server 150 may perform such malware analysis, or supplemental analysis, and report such analysis to the computing device 100.

As discussed above, the computing device 100 is configured to communicate with the remote malware analysis server 150 over the network 160. The network 160 may be embodied as any type of network capable of facilitating communications between the computing device 100, the remote malware analysis server 150, and/or other remote devices. In the illustrative embodiment, the network 160 is embodied as a publicly accessible, global network such as the Internet. The network 160 may include any number of additional devices, such as additional remote hosts, computers, routers, and switches, to facilitate communications between the computing device 100, the remote malware analysis server 150, and/or other devices.

Figure 2:
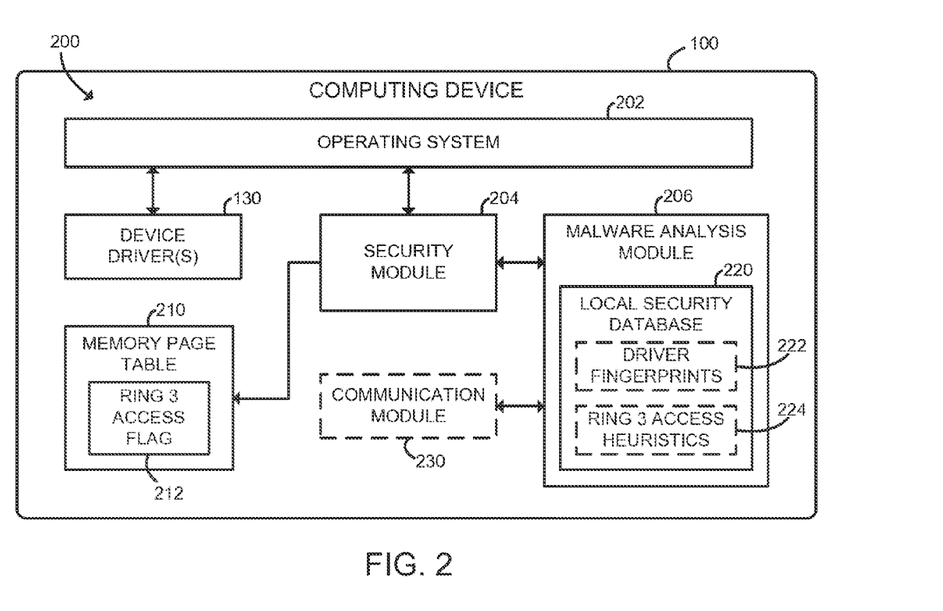
FIG. 2 is a simplified block diagram of at least one embodiment of an environment of the computing device of the system of FIG. 1.

Referring now to FIG. 2, in the illustrative embodiment, the computing device 100 establishes an environment 200 during operation. The illustrative environment 200 includes an operating system 202 that executes one or more of the drivers, a security module 204, and a malware analysis module 206. In some embodiments, the environment 200 may also include a communication module 208 as discussed in more detail below. The security module 204, the malware analysis module 206, and/or communication module 208 may be embodied as software, firmware, hardware, or a combination thereof. Additionally, in some embodiments, some or all of the modules of the environment 200 may be included in, or form part of, other modules or software/firmware structures. For example, in some embodiments, the security module 204, or portion thereof, may be included in the operating system 202.

The security module 204 is configured to monitor the device driver(s) 130 for attempted cross ring memory accesses. A cross ring memory access can occur at any time in which the device driver 130 attempts to access a memory location that is not within the same privilege domain or ring as the calling device driver 130. For example, as shown in an illustrative embodiment in FIG. 3, the computing device 100 has a security architecture having two privilege protection domains or rings—a high privilege protection Ring 0 300 and a lower privilege protection Ring 3 302. The operating system 202 and the device drivers 130 are executed in the high privilege protection Ring 0 300. In such embodiments, the device drivers 130 may access memory locations belonging to the protection Ring 0 300 without generally causing an exception. However, if a device driver 130 attempts to perform a cross ring memory access 304 to access a memory location within the protection Ring 3 302, a memory exception is generated. Again, as discussed above, the security architecture of the computing device 100 may include additional protection rings or domains in other embodiments.

Figure 3:
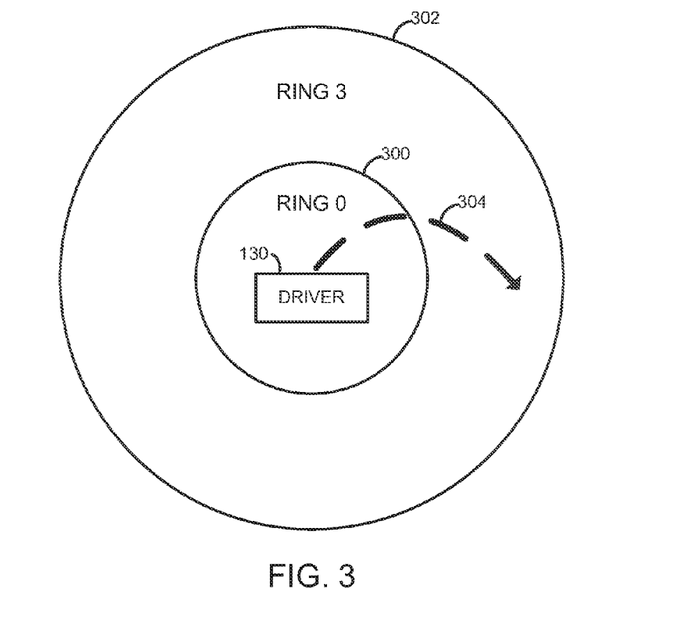
FIG. 3 is a simplified illustration of a visualized cross ring memory access by a device driver of the computing device of FIGS. 1 and 2.

In some embodiments, cross ring memory accesses from lower privilege-to-higher privilege (e.g. from Ring 3 302 to Ring 0 300) are globally disabled. In such embodiments, the security module 204 may primarily or exclusively monitor for higher privilege-to-lower privilege memory accesses as discussed above. As such, although the illustrative computing device 100 and environment 200 are described hereafter with reference to cross ring memory accesses, it should be appreciated that such cross ring memory accesses may embody all memory accesses in which the device driver 130 attempts to access a memory location that is not within the same privilege domain or ring as the calling device driver 130 or only those memory accesses that are targeted to a privilege domain that has a lower privilege than the domain from which the attempted memory access originates (i.e. the privilege domain of the device driver 130).

Referring back to FIG. 2, the security module 204 configures a memory page table 210 associated with each device driver 130 to disable cross ring memory accesses during boot or initialization of the computing device 100 (or other suitable time). The memory page table 210, similar to typical memory page tables, provides a mapping between the virtual memory addresses and physical memory address in which the device driver 130 is loaded on the memory 106 of the computing device 100. The memory page table 210 includes settings, such as registers or flags, which may be configured to modify the behavior of the memory page table 210 and supporting functionality. As such, in some embodiments, the security module 204 may set (i.e., configure to either a logic high or low, as needed) a Ring 3 access flag 212 of the memory page table 210 to disable cross ring memory accesses. Once disabled, if the associated device driver 130 attempts to perform a cross ring memory access, an exception is thrown (i.e., an error is generated). The security module 204 is configured to trap the cross ring memory access (e.g. intercept the exception thrown in response to the attempted cross ring memory access) and interface with the malware analysis module 206 to determine whether the calling device driver 130 is malicious.

The malware analysis module 206 is configured to analyze the device driver 130 that attempted the cross ring memory access, and/or the cross ring memory access itself, to determine whether the device driver 130 is malicious or not. To do so, the security module 204 may pass the code of the device driver 130 or identification data thereof (e.g., a pointer to the device driver 130 in memory 106) to the malware analysis module 206. In some embodiments, the security module 204 may also pass additional, related information such as the address from which the attempted cross ring memory access originated and the destination address (e.g. the Ring 3 address) of the attempted cross ring memory access. The malware analysis module 206 compares the device driver 130 to a local security database 202 to determine whether security data is available for that particular device driver 130. If so, the device driver 130 is compared against the security data to determine or infer whether the device driver 130 is malicious. For example, the device driver 130 may be compared to a local driver fingerprint 222, similar to driver fingerprints 154, stored in the local security database 220. As discussed above, driver fingerprints may be embodied as any type of data usable to determine whether the device driver 130 is malicious. In some embodiments, the driver fingerprints 222 may be embodied as a bit mask of the device driver 130 program. In such embodiments, the malware analysis module 206 may compare the bit mask of the driver fingerprint 222 to the code of the device driver 130 to determine whether the device driver 130 has been modified. Additionally or alternatively, the driver fingerprint 222 may identify addresses of the device driver 130 from which allowed cross ring memory accesses originate and/or destination address of such allowed cross ring memory accesses. In such embodiments, the malware analysis module 206 may compare the addresses of attempted cross ring memory access or other addresses of the calling device driver 130 to the addresses identified by the driver fingerprint 222. Further, in some embodiments, the malware analysis module 206 may include a call stack of operations to perform to determine whether the device driver 130 is malicious or not and/or may consult external sources, such as the remote malware analysis server 150, over the network 160.

Although the illustrative embodiment the malware analysis module 206 is configured to analyze the operation of the device driver 130 to determine whether the device driver 130 is malicious, the malware analysis module 206 may, additionally or alternatively, analyze the operation of the device driver 130 to determine whether the device driver 130 is "buggy" or otherwise operating in an unexpected manner. Buggy drivers may be exploited to perform unauthorized access by other malicious software (e.g., performing an access that has not historically been performed by that particular device driver 130). In this way, the malware analysis module 206 determines, or otherwise infers, whether the access by device driver 130 should be permitted or prevented because the device driver 130 is buggy, untrustworthy, or otherwise malicious.

The malware analysis module 206 may also analyze the destination Ring 3 memory address of the attempted cross ring memory access to determine or infer whether the calling device driver 130 is malicious. To do so, the malware analysis module 206 may compare the destination address to ring 3 access heuristics 224 (or other protection ring heuristics based on the attempted access), which are maintained in the local security database 220. The ring 3 access heuristics 224 provide historical data related to the access behavior for that particular ring 3 memory address. If the access of such memory addresses is determined to be suspicious based on historical access data, the malware analysis module 206 may infer that the device driver 130 is malicious or is acting in a malicious manner. It should be appreciated that if the device driver 130 is not located in the local security database 220, the use of the ring 3 access heuristics may be the only security measure available to the malware analysis module 206 at that time. However, if the device driver 130 is not located in the local security database 220, the malware analysis module 206 may transmit data related to the device driver 130 and/or the attempted cross ring memory access to the remote malware analysis server 150 such that a driver fingerprint 154 may be initiated. As discussed above, the remote malware analysis server 150 will update periodically or occasionally the computing device 100 with new or updated driver fingerprints 154, which are stored in the local security database 220 as driver fingerprints 222.

If the device driver 130 is determined not to be malicious, the security module 204 updates the memory page table 210 to allow the attempted cross ring memory access. However, if the device driver 130 is determined to be malicious, the security module 204 denies the attempted cross ring memory access. Additionally, in some embodiments, the calling device driver 130 may be aborted and an alert to the user of the computing device 100 may be generated.

Figure 4:
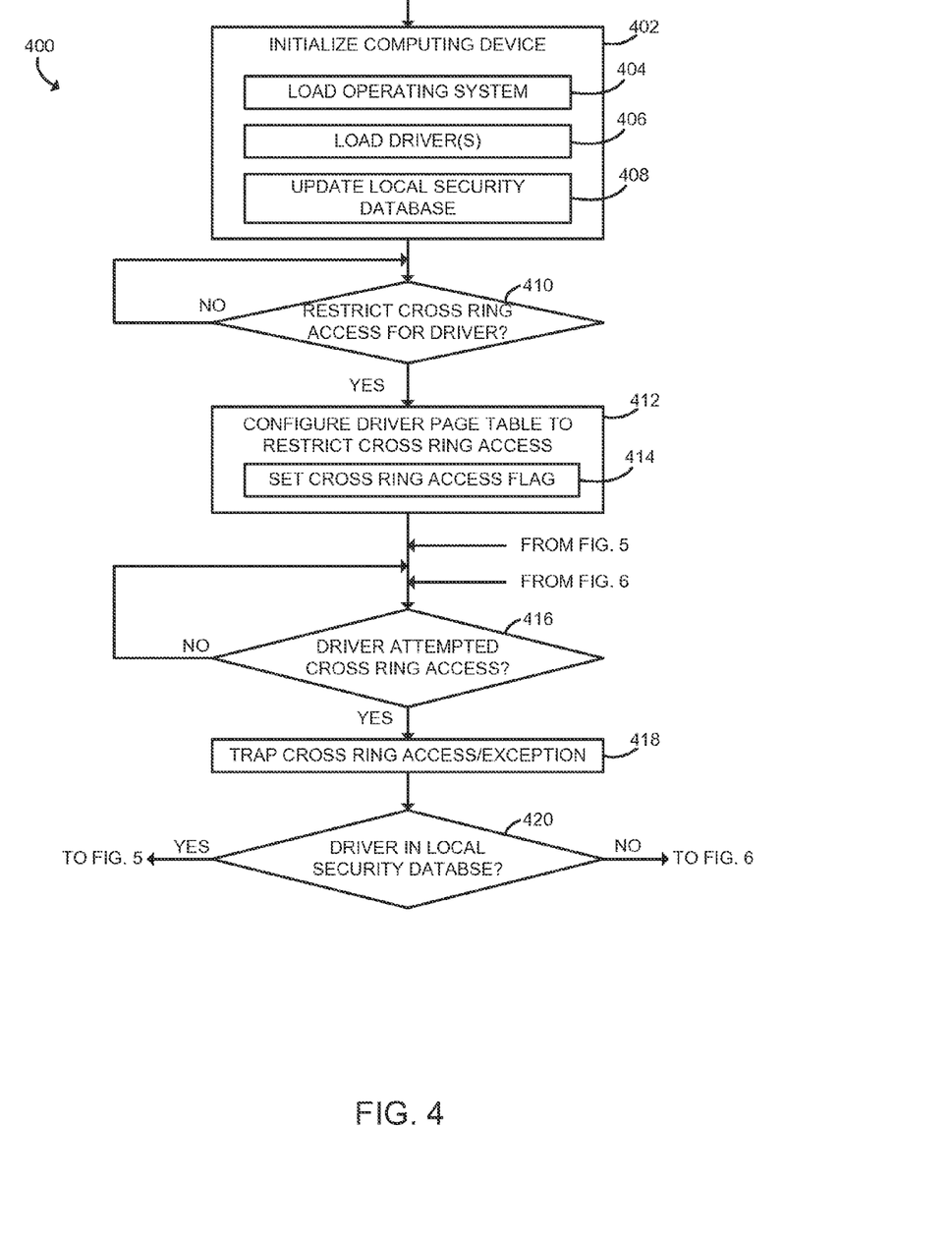
FIGS. 4-6 are a simplified flow diagram of at least one embodiment of method for managing device driver(s) cross ring memory accesses on the computing device of FIGS. 1 and 2.
Figure 5:
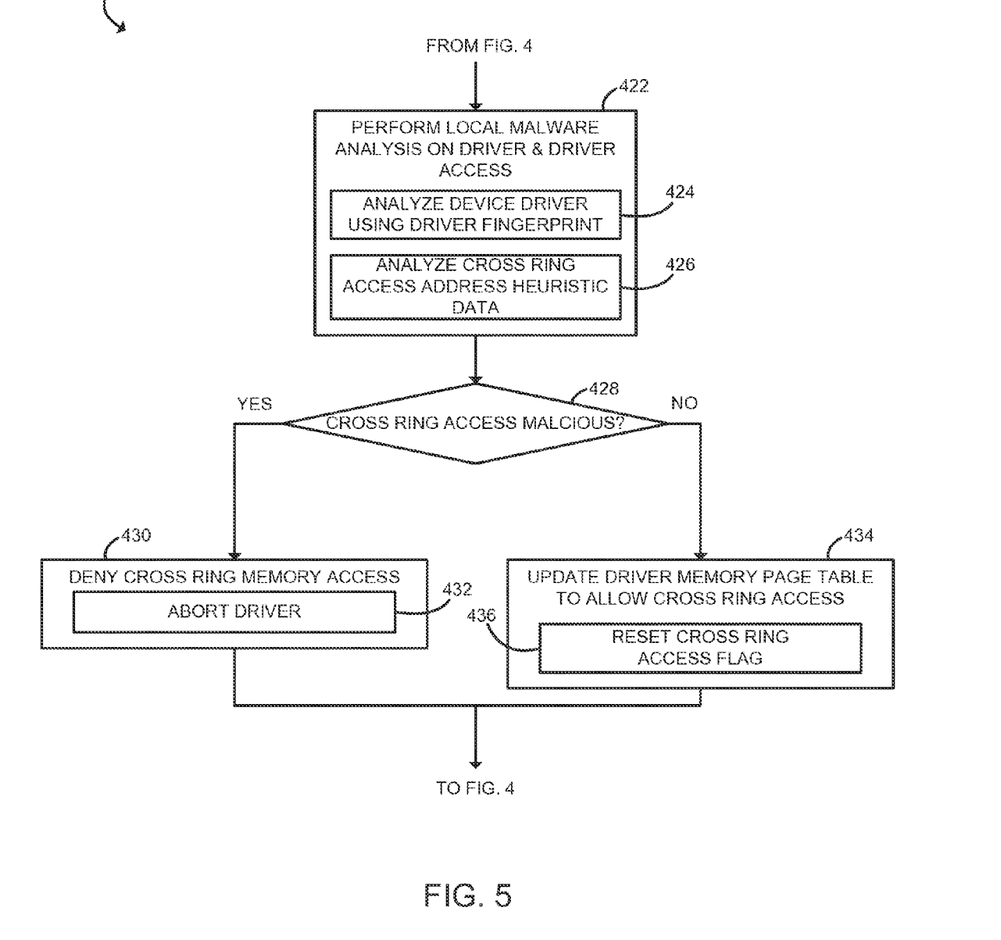
Figure 6:
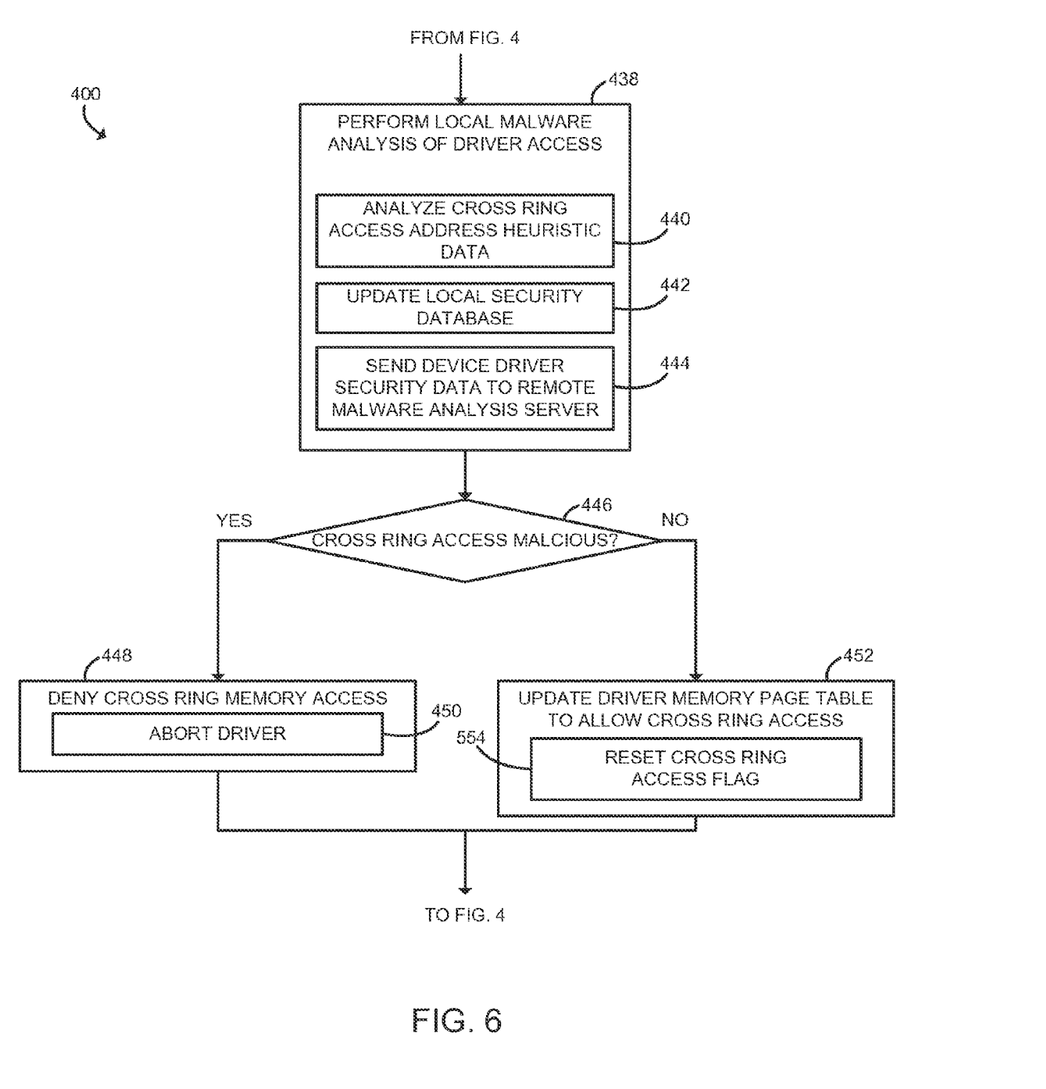

Referring now to FIGS. 4-6, in use, the computing device 100 may execute a method 400 for managing device driver(s) cross ring memory accesses by device drivers 130 executed on the computing device 100. The method 400 begins with block 402 in which the computing device 100 is initialized. During block 402, the computing device 100 may perform various initialization procedures. For example, in block 404, the computing device 100 may load the operating system 202. Additionally, in block 406, the operating system 202 of the computing device 100 may load one or more device drivers 130 as discussed above. Further, in block 408, the computing device 100 may update the local security database 220. To do so, the malware analysis module 206 may communicate with the remote malware analysis server 150 via the communication module 230 to receive updated security data, such as updated driver fingerprints 154 and/or other security data. As discussed in more detail below, such security data is used by the malware analysis module 206 of the computing device 100 to determine whether the device driver(s) 130 is malicious. Although the local security database 220 is shown as being updated in block 408, it should be appreciated that the local security database 220 may be updated at any time during execution of the method 400. That is, the computing device 100 may periodically, continually, occasionally, or responsively communicate with the remote malware analysis server 150 to receive security data updates, which are stored in the local security database 220.

In block 410, the computing device 100 determines whether cross ring memory accesses should be restricted for one or more of the device drivers 130 loaded on the computing device 100. That is, in some embodiments, the computing device 100 may monitor and restrict cross ring memory access for only some of the device drivers 130. Of course, in other embodiments, each device driver 130 loaded on the computing device 100 may be monitored for cross ring memory accesses.

If one or more device drivers 130 are to be monitored for restricted cross ring memory accesses, the method 400 advances to block 412. In block 412, the security module 204 configures the memory page table 210 associated with each monitored device driver 130 to disable cross ring memory accesses. As discussed above, the memory page table 210 provides a mapping between the virtual memory addresses and physical memory addresses at which the device driver 130 is loaded in the memory 106 of the computing device 100. Additionally, in the illustrative embodiment, the memory page table 210 includes control bits that control the functionality of software or code stored at the mapped memory location (e.g., what the code is allowed or not allowed to do, what resources the code has access to, etc.). The security module 204 may configure the memory page table 210 to disable cross ring memory access by the corresponding device driver 130 using any suitable mechanism. For example, in the illustrative embodiment, the security module 204 sets a register or flag (i.e., configures one of the control bits to either a logic high or a logic low depending on the particular implementation) of the memory page table 210 to disable cross ring memory access in block 414. Because the cross ring memory access has been disabled for the device driver(s) 130 in this way, an exception or error is generated in response to any attempted cross ring memory access by the device driver(s) 130.

In block 416, the security module 204 monitors for any attempted cross ring access by the device driver(s) 130. If a device driver 130 attempts a cross ring memory access, the attempted cross ring memory access is trapped, or otherwise intercepted, in block 418. To do so, the attempted cross ring memory access itself may be intercepted or trapped or, in some embodiments, the exception or error generated by the attempted cross ring memory access is intercepted or trapped. Regardless, the attempted cross ring memory access is trapped or intercepted prior to completing such that the calling device driver 130 is denied access to the desired cross ring memory.

In response to trapping/intercepting the attempted cross ring memory access, the security module 204 interfaces with the malware analysis module 206 to determine whether the calling device driver 130 is malicious or not. To do so, the security module 204 may provide the device driver 130 itself (i.e. the code of the device driver 130) or an identifier (e.g., a pointer to the device driver 130 in memory or other identifier) to the malware analysis module 206. The malware analysis module 206 determines whether the calling device driver 130 is listed in the local security database 220 in block 420. That is, the malware analysis module 206 determines whether an entry for the calling device driver 130 is included in the local security database 220. If the calling device driver 130 is not listed in the local security database 220, the attempted cross ring memory access may be the first attempt from that particular device driver 130 on the computing device 100 and, as such, the availability of security data to analyze the device driver 130 may be limited as discussed below.

However, if the calling device driver 130 is listed in the local security database 220, the local security database 220 includes security data usable to analyze the device driver 130. As such, the method 400 advances to block 422 (see FIG. 5) in which the malware analysis module 206 performs a local malware analysis of the calling device driver 130 to determine whether the device driver 130 is malicious or not. To do so, the malware analysis module 206 may compare the device driver 130 to security data stored in the local security database 220. For example, in block 424, the malware analysis module 206 may compare the device driver 130 to an associated driver fingerprint 222 stored in the local security database 220. As discussed above, the driver fingerprint 222 may be embodied as any type of data usable to determine whether the device driver 130 is malicious. For example, in some embodiments, the driver fingerprint 222 may be embodied as a bit mask of the device driver 130, which is compared to the code of the device driver 130 to determine whether the calling device driver 130 has been modified relative to the driver fingerprint 222. Additionally or alternatively, the driver fingerprint 222 may identify origination addresses of the device driver 130 from which cross ring memory accesses are allowed and/or destination addresses of such allowed cross ring memory accesses. In such embodiments, the malware analysis module 206 compares the addresses of the driver fingerprint 222 to the addresses of the calling device driver 130 in block 424 to determine whether the device driver 130 is malicious or not.

Additionally, in some embodiments, the malware analysis module 206 may compare heuristic data related to the destination address of the attempted cross ring memory access in block 426. That is, the malware analysis module 206 may analyze prior cross ring memory accesses to the destination address of the attempted cross ring memory access, and other related historical access data, to further determine or infer whether the device driver 130 is malicious or not.

In block 428, the malware analysis module 206 determines whether the device driver 130 is malicious based on the various analyses performed in block 422. If the device driver 130 is determined to be malicious, the attempted cross ring memory access is denied by the security module 204 in block 430. Additionally, in some embodiments, the calling device driver 130 may be aborted (e.g., the execution of the device driver may be discontinued) in block 432. Further, the security module 204 may perform additional security functions in some embodiments including, for example, generating an alert on the computing device 100 to notify a user of the security violation, sending information to the remote malware analysis server 150 regarding the security violation and/or calling device driver 130, and/or other security functions. After the attempted cross ring memory access has been denied in block 430, the method 400 loops back to block 416 (see FIG. 4) in which the security module 204 continues to monitor for cross ring memory accesses.

Referring back to block 428, if the cross ring memory access is determined not to be malicious, the method 400 advances to block 434 in which the security module 204 updates the memory page table 210 to allow the attempted cross ring memory access by the device driver 130. To do so, for example, the security module 204 may reset/set a flag or register of the memory page table 210 to allow the attempted cross ring memory access in block 436. After the attempted cross ring memory access has been enabled in block 434, the method 400 loops back to block 416 (see FIG. 4) in which the security module 204 continues to monitor for cross ring memory accesses.

Referring back to block 420, if the calling device driver 130 is not listed in the local security database 220, the method 400 advances to block 438 (see FIG. 6) in which the malware analysis module 206 attempts to perform a local malware analysis of the calling device driver 130. However, because no driver fingerprint 222 is available for the calling device driver 130, the malware analysis module 206 attempts to determine or infer whether the device driver 130 is malicious using only heuristic data (if available) related to the destination address of the attempted cross ring memory access in block 440. If no heuristic data is available, the malware analysis module 206 may assume the device driver 130 is not malicious in some embodiments. Alternatively, in other embodiments, the malware analysis module 206 may assume the device driver 130 is malicious if no heuristic data is available to perform a sufficient analysis.

Regardless, in block 442, the malware analysis module 206 updates the local security database 220. That is, in some embodiments, the malware analysis module 206 may generate a new driver fingerprint 222 for the unknown, calling device driver 130. The driver fingerprint 222 may include security data related to the calling device driver 130 and/or destination/origination memory addresses related to the attempted cross ring memory access. Additionally or alternatively, the malware analysis module 206 may transmit such security data to the remote malware analysis server 150 to allow the remote malware analysis server 150 to generate or update a driver fingerprint 154 for the calling device driver 130. Over time, the driver fingerprints 154, 222 are updated with additional security data until the driver fingerprints 154, 222 are substantial enough to facilitate the analysis of the device driver 130 using such driver fingerprints 154, 222. As discussed above, the malware analysis module 206 may update periodically or occasionally the local security database 220 with security data (e.g., new or updated driver fingerprints 222) from the remote malware analysis server 150.

Subsequently, in block 446, the malware analysis module 206 determines whether the device driver 130 is malicious based on the analysis (if any) performed in block 438. If the device driver 130 is determined (or assumed) to be malicious, the attempted cross ring memory access is denied by the security module 204 in block 448. Additionally, as discussed above, the calling device driver 130 may be aborted in block 450 in some embodiments. Further, the security module 204 may perform additional or other security functions in some embodiments. After the attempted cross ring memory access has been denied in block 448, the method 400 loops back to block 416 (see FIG. 4) in which the security module 204 continues to monitor for cross ring memory accesses.

Referring back to block 446, if the cross ring memory access is determined (or assumed) to be not malicious, the method 400 advances to block 452 in which the security module 204 updates the memory page table 210 to allow the attempted cross ring memory access by the device driver 130. To do so, the security module 204 may reset/set a flag or register of the memory page table 210 to allow the attempted cross ring memory access in block 554 as discussed above. After the attempted cross ring memory access has been enabled in block 452, the method 400 loops back to block 416 (see FIG. 4) in which the security module 204 continues to monitor for cross ring memory accesses.

EXAMPLES

Illustrative examples of the technologies disclosed herein are provided below. An embodiment of the technologies may include any one or more, and any combination of, the examples described below.

Example 1 includes a computing device for managing cross ring memory accesses by a device driver on the computing device, the computing device comprising a security module to (i) configure a memory page table associated with the device driver to disable cross ring memory accesses by the device driver and (ii) trap an attempted cross ring memory access by the device driver subsequent to configuration of the associated memory page table; and a malware analysis module to analyze the device driver in response to trapping the attempted cross ring memory access to determine whether the device driver is malicious, wherein the security module is further to deny the attempted cross ring memory access in response to a determination by the malware analysis module that the device driver is malicious.

Example 2 includes the subject matter of Example 1, and wherein the security module is further to update the memory page table associated with the device driver to allow the attempted cross ring memory access in response to a determination by the malware analysis module that the device driver is not malicious.

Example 3 includes the subject matter of any of Examples 1 and 2, and wherein the security module is to set a flag in the memory page table to disable cross ring memory accesses by the device driver.

Example 4 includes the subject matter of any of Examples 1-3, and further including an operating system to execute the device driver in a higher privilege ring of the computing device, and wherein the security module is to set the flag in the memory page table to disable memory accesses from the higher privilege ring to a lower privilege ring of the computing device.

Example 5 includes the subject matter of any of Examples 1-4, and wherein the security module is to trap a memory access originating from a first protection ring established on the computing device to a second protection ring, different from the first protection ring, established on the computing device.

Example 6 includes the subject matter of any of Examples 1-5, and wherein the security module is to trap all cross ring memory accesses attempted by each device driver executed on the computing device.

Example 7 includes the subject matter of any of Examples 1-6, and wherein the malware analysis module is to compare the device driver to security data stored in a local security database to determine whether the device driver is malicious.

Example 8 includes the subject matter of any of Examples 1-7, and wherein the malware analysis module is to match the device driver to a reference device driver stored in a local security database; and compare a driver fingerprint of the reference device driver to the device driver.

Example 9 includes the subject matter of any of Examples 1-8, and wherein the malware analysis module is to compare an address of the driver fingerprint to an address of the device driver from which the attempted cross ring memory access originated.

Example 10 includes the subject matter of any of Examples 1-9, and wherein the malware analysis module is to compare a bit mask to the memory page table associated with the device driver.

Example 11 includes the subject matter of any of Examples 1-10, and wherein the malware analysis module is to compare a plurality of addresses associated with the reference device driver to addresses associated with the device driver.

Example 12 includes the subject matter of any of Examples 1-11, and wherein the malware analysis module is further to receive an updated driver fingerprint for the device driver from a remote malware analysis server and store the updated driver fingerprint in the local security database.

Example 13 includes the subject matter of any of Examples 1-12, and wherein the malware analysis module is to determine whether the device driver matches a reference device driver stored in a local security database; and generate a driver fingerprint for the device driver in response to the device driver not matching any reference driver stored in the local security database.

Example 14 includes the subject matter of any of Examples 1-13, and wherein the malware analysis module is to generate a driver fingerprint that identifies an address from which the cross ring memory access of the device driver originated.

Example 15 includes the subject matter of any of Examples 1-14, and wherein the malware analysis module is further to send the generated driver fingerprint to a remote malware analysis server.

Example 16 includes the subject matter of any of Examples 1-15, and wherein the malware analysis module is to determine whether the device driver matches a reference device driver stored in the local security database; and update, in response to the device driver not matching any reference device driver stored in the local security database, the memory page table associated with the device driver to allow the attempted cross ring memory access.

Example 17 includes the subject matter of any of Examples 1-16, and wherein the malware analysis module is to reset a flag in the memory page table to enable cross ring memory accesses by the device driver.

Example 18 includes the subject matter of any of Examples 1-17, and wherein the malware analysis module is to compare a destination address of the attempted cross ring memory access to security data stored in a local security database to determine whether the device driver is malicious.

Example 19 includes the subject matter of any of Examples 1-18, and wherein the malware analysis module is to compare the destination address of the attempted cross ring memory access to heuristic data of prior cross ring memory accesses to the destination address.

Example 20 includes the subject matter of any of Examples 1-19, and wherein the malware analysis module is to compare a protection Ring 3 destination address of the attempted cross ring memory access to a protection Ring 3 address stored in the local security database.

Example 21 includes the subject matter of any of Examples 1-20, and wherein the security module is to abort the device driver in response to the determination by the malware analysis module that the device driver is malicious.

Example 22 includes the subject matter of any of Examples 1-21, and wherein the security module is to reset a flag in the memory page table to enable cross ring memory accesses by the device driver.

Example 23 includes the subject matter of any of Examples 1-22, and wherein the security module is to generate an alert on the computing device in response to determining the device driver is malicious.

Example 24 includes the subject matter of any of Examples 1-23, and wherein the malware analysis module is further to receive an updated driver fingerprint for the device driver from a remote malware analysis server and store the updated driver fingerprint in a local security database.

Example 25 includes a method for managing cross ring memory accesses by a device driver on a computing device, the method comprising configuring, on the computing device, a memory page table associated with the device driver to disable cross ring memory accesses by the device driver; trapping an attempted cross ring memory access by the device driver subsequent to configuration of the associated memory page table; analyzing the device driver in response to trapping the attempted cross ring memory access to determine whether the device driver is malicious; and denying the attempted cross ring memory access in response to determining the device driver is malicious.

Example 26 includes the subject matter of Example 25, and further including updating the memory page table associated with the device driver to allow the attempted cross ring memory access in response to determining the device driver is not malicious.

Example 27 includes the subject matter of any of Examples 25 and 26, and wherein configuring the memory page table associated with the device driver comprises setting a flag in the memory page table to disable cross ring memory accesses by the device driver.

Example 28 includes the subject matter of any of Examples 25-27, and further including executing the device driver in a higher privilege ring of the computing device, and wherein setting the flag in the memory page table comprises setting a flag in the memory page table to disable memory accesses from the higher privilege ring to a lower privilege ring of the computing device.

Example 29 includes the subject matter of any of Examples 25-28, and wherein trapping an attempted cross ring memory access comprises trapping a memory access originating from a first protection ring established on the computing device to a second protection ring, different from the first protection ring, established on the computing device.

Example 30 includes the subject matter of any of Examples 25-29, and wherein trapping an attempted cross ring memory access comprises trapping all cross ring memory accesses attempted by each device driver executed on the computing device.

Example 31 includes the subject matter of any of Examples 25-30, and wherein analyzing the device driver comprises comparing the device driver to security data stored in a local security database to determine whether the device driver is malicious.

Example 32 includes the subject matter of any of Examples 25-31, and wherein analyzing the device driver comprises matching the device driver to a reference device driver stored in a the local security database, and comparing a driver fingerprint of the reference device driver to the device driver.

Example 33 includes the subject matter of any of Examples 25-32, and wherein comparing the driver fingerprint comprises comparing an address of the driver fingerprint to an address of the device driver from which the attempted cross ring memory access originated.

Example 34 includes the subject matter of any of Examples 25-33, and wherein comparing the driver fingerprint comprises comparing a bit mask to the memory page table associated with the device driver.

Example 35 includes the subject matter of any of Examples 25-34, and wherein comparing the driver fingerprint comprises comparing a plurality of addresses associated with the reference device driver to addresses associated with the device driver.

Example 36 includes the subject matter of any of Examples 25-35, and further including receiving an updated driver fingerprint for the device driver from a remote malware analysis server and storing the updated driver fingerprint in the local security database.

Example 37 includes the subject matter of any of Examples 25-36, and wherein analyzing the device driver comprises determining whether the device driver matches a reference device driver stored in a local security database; and generating a driver fingerprint for the device driver in response to the device driver not matching any reference driver stored in the local security database.

Example 38 includes the subject matter of any of Examples 25-37, and wherein generating a driver fingerprint comprises generating a driver fingerprint that identifies an address from which the cross ring memory access of the device driver originated.

Example 39 includes the subject matter of any of Examples 25-38, and further including sending the generated driver fingerprint to a remote malware analysis server.

Example 40 includes the subject matter of any of Examples 25-39, and wherein analyzing the device driver comprises determining whether the device driver matches a reference device driver stored in the local security database; and updating, in response to the device driver not matching any reference device driver stored in the local security database, the memory page table associated with the device driver to allow the attempted cross ring memory access.

Example 41 includes the subject matter of any of Examples 25-40, and wherein updating the memory page table associated with the device driver comprises resetting a flag in the memory page table to enable cross ring memory accesses by the device driver.

Example 42 includes the subject matter of any of Examples 25-41, and wherein analyzing the attempted cross ring memory access comprises comparing a destination address of the attempted cross ring memory access to security data stored in a local security database to determine whether the device driver is malicious.

Example 43 includes the subject matter of any of Examples 25-42, and wherein comparing the destination address of the attempted cross ring memory access comprises comparing the destination address of the attempted cross ring memory access to heuristic data of prior cross ring memory accesses to the destination address.

Example 44 includes the subject matter of any of Examples 25-43, and wherein comparing the destination address of the attempted cross ring memory access comprises comparing a protection Ring 3 destination address of the attempted cross ring memory access to a protection Ring 3 address stored in the local security database.

Example 45 includes the subject matter of any of Examples 25-44, and wherein denying the attempted cross ring memory access comprises aborting the device driver.

Example 46 includes the subject matter of any of Examples 25-45, and wherein updating the memory page table associated with the device driver comprises resetting a flag in the memory page table to enable cross ring memory accesses by the device driver.

Example 47 includes the subject matter of any of Examples 25-46, and further including generating an alert on the computing device in response to determining the device driver is malicious.

Example 48 includes the subject matter of any of Examples 25-47, and further including receiving an updated driver fingerprint for the device driver from a remote malware analysis server and storing the updated driver fingerprint in a local security database.

Example 49 includes a computing device comprising a processor; and a memory having stored therein a plurality of instructions that when executed by the processor cause the computing device to perform the method of any of Examples 25-48.

Example 50 includes one or more machine readable storage media comprising a plurality of instructions stored thereon that in response to being executed result in a computing device performing the method of any of Examples 25-48.

Example 51 includes s computing device for managing cross ring memory accesses, the computing device comprising means for configuring a memory page table associated with the device driver to disable cross ring memory accesses by the device driver; means for trapping an attempted cross ring memory access by the device driver subsequent to configuration of the associated memory page table; means for analyzing the device driver in response to trapping the attempted cross ring memory access to determine whether the device driver is malicious; and means for denying the attempted cross ring memory access in response to determining the device driver is malicious.

Example 52 includes the subject matter of Example 51, and further including means for updating the memory page table associated with the device driver to allow the attempted cross ring memory access in response to determining the device driver is not malicious.

Example 53 includes the subject matter of any of Examples 51 and 52, and wherein the means for configuring the memory page table associated with the device driver comprises means for setting a flag in the memory page table to disable cross ring memory accesses by the device driver.

Example 54 includes the subject matter of any of Examples 51-53, and further including means for executing the device driver in a higher privilege ring of the computing device, and wherein the means for setting the flag in the memory page table comprises means for setting a flag in the memory page table to disable memory accesses from higher privilege ring to a lower privilege ring of the computing device.

Example 55 includes the subject matter of any of Examples 51-54, and wherein the means for trapping an attempted cross ring memory access comprises means for trapping a memory access originating from a first protection ring established on the computing device to a second protection ring, different from the first protection ring, established on the computing device.

Example 56 includes the subject matter of any of Examples 51-55, and wherein the means for trapping an attempted cross ring memory access comprises means for trapping all cross ring memory accesses attempted by each device driver executed on the computing device.

Example 57 includes the subject matter of any of Examples 51-56, and wherein the means for analyzing the device driver comprises means for comparing the device driver to security data stored in a local security database to determine whether the device driver is malicious.

Example 58 includes the subject matter of any of Examples 51-57, and wherein the means for analyzing the device driver comprises means for matching the device driver to a reference device driver stored in a local security database; and means for comparing a driver fingerprint of the reference device driver to the device driver.

Example 59 includes the subject matter of any of Examples 51-58, and wherein the means for comparing the driver fingerprint comprises means for comparing an address of the driver fingerprint to an address of the device driver from which the attempted cross ring memory access originated.

Example 60 includes the subject matter of any of Examples 51-59, and wherein the means for comparing the driver fingerprint comprises means for comparing a bit mask to the memory page table associated with the device driver.

Example 61 includes the subject matter of any of Examples 51-60, and wherein the means for comparing the driver fingerprint comprises means for comparing a plurality of addresses associated with the reference device driver to addresses associated with the device driver.

Example 62 includes the subject matter of any of Examples 51-61, and further including means for receiving an updated driver fingerprint for the device driver from a remote malware analysis server and means for storing the updated driver fingerprint in the local security database.

Example 63 includes the subject matter of any of Examples 51-62, and wherein the means for analyzing the device driver comprises means for determining whether the device driver matches a reference device driver stored in a local security database; and means for generating a driver fingerprint for the device driver in response to the device driver not matching any reference driver stored in the local security database.

Example 64 includes the subject matter of any of Examples 51-63, and wherein the means for generating a driver fingerprint comprises means for generating a driver fingerprint that identifies an address from which the cross ring memory access of the device driver originated.

Example 65 includes the subject matter of any of Examples 51-64, and further including means for sending the generated driver fingerprint to a remote malware analysis server.

Example 66 includes the subject matter of any of Examples 51-65, and wherein the means for analyzing the device driver comprises means for determining whether the device driver matches a reference device driver stored in the local security database; and means for updating, in response to the device driver not matching any reference device driver stored in the local security database, the memory page table associated with the device driver to allow the attempted cross ring memory access.

Example 67 includes the subject matter of any of Examples 51-66, and wherein the means for updating the memory page table associated with the device driver comprises means for resetting a flag in the memory page table to enable cross ring memory accesses by the device driver.

Example 68 includes the subject matter of any of Examples 51-67, and wherein the means for analyzing the attempted cross ring memory access comprises means for comparing a destination address of the attempted cross ring memory access to security data stored in a local security database to determine whether the device driver is malicious.

Example 69 includes the subject matter of any of Examples 51-68, and wherein the means for comparing the destination address of the attempted cross ring memory access comprises means for comparing the destination address of the attempted cross ring memory access to heuristic data of prior cross ring memory accesses to the destination address.

Example 70 includes the subject matter of any of Examples 51-69, and wherein the means for comparing the destination address of the attempted cross ring memory access comprises means for comparing a protection Ring 3 destination address of the attempted cross ring memory access to a protection Ring 3 address stored in the local security database.

Example 71 includes the subject matter of any of Examples 51-70, and wherein the means for denying the attempted cross ring memory access comprises means for aborting the device driver.

Example 72 includes the subject matter of any of Examples 51-71, and wherein the means for updating the memory page table associated with the device driver comprises means for resetting a flag in the memory page table to enable cross ring memory accesses by the device driver.

Example 73 includes the subject matter of any of Examples 51-72, and further including means for generating an alert on the computing device in response to determining the device driver is malicious.

Example 74 includes the subject matter of any of Examples 51-73, and further including means for receiving an updated driver fingerprint for the device driver from a remote malware analysis server and means for storing the updated driver fingerprint in a local security database.

What is claimed is:

1. A computing device for managing cross ring memory accesses by a device driver on the computing device, the computing device comprising:
  a security module to (i) configure a memory page table associated with the device driver to disable cross ring memory accesses by the device driver and (ii) trap an attempted cross ring memory access by the device driver subsequent to configuration of the associated memory page table; and
  a malware analysis module to analyze the device driver in response to trapping the attempted cross ring memory access to determine whether the device driver is malicious, wherein to analyze the device driver comprises to compare an address of a driver fingerprint of a reference device driver to an address of the device driver from which the attempted cross ring memory access originated,
  wherein the security module is further to deny the attempted cross ring memory access in response to a determination by the malware analysis module that the device driver is malicious.

2. The computing device of claim 1, wherein the security module is further to update the memory page table associated with the device driver to allow the attempted cross ring memory access in response to a determination by the malware analysis module that the device driver is not malicious.

3. The computing device of claim 1, further comprising an operating system to execute the device driver in a higher privilege ring of the computing device, and
  wherein the security module is to set a flag in the memory page table to disable memory accesses from the higher privilege ring to a lower privilege ring of the computing device.

4. The computing device of claim 1, wherein the malware analysis module is to:
  match the device driver to the reference device driver stored in a local security database; and
  compare a driver fingerprint of the reference device driver to the device driver.

5. The computing device of claim 4, wherein the malware analysis module is to compare a bit mask to the memory page table associated with the device driver.

6. The computing device of claim 1, wherein the malware analysis module is to:
  determine whether the device driver matches a reference device driver stored in a local security database; and
  generate a driver fingerprint for the device driver in response to the device driver not matching any reference driver stored in the local security database.

7. The computing device of claim 6, wherein the malware analysis module is to:
  determine whether the device driver matches a reference device driver stored in the local security database; and
  update, in response to the device driver not matching any reference device driver stored in the local security database, the memory page table associated with the device driver to allow the attempted cross ring memory access.

8. The computing device of claim 1, wherein the malware analysis module is to compare a destination address of the attempted cross ring memory access to security data stored in a local security database to determine whether the device driver is malicious.

9. The computing device of claim 8, wherein the malware analysis module is to compare the destination address of the attempted cross ring memory access to heuristic data of prior cross ring memory accesses to the destination address.

10. A method for managing cross ring memory accesses by a device driver on a computing device, the method comprising:
  configuring, on the computing device, a memory page table associated with the device driver to disable cross ring memory accesses by the device driver;
  trapping an attempted cross ring memory access by the device driver subsequent to configuration of the associated memory page table;
  analyzing the device driver in response to trapping the attempted cross ring memory access to determine whether the device driver is malicious, wherein analyzing the device driver comprises comparing an address of a driver fingerprint of a reference device driver to an address of the device driver from which the attempted cross ring memory access originated; and denying the attempted cross ring memory access in response to determining the device driver is malicious.

11. The method of claim 10, further comprising updating the memory page table associated with the device driver to allow the attempted cross ring memory access in response to determining the device driver is not malicious.

12. The method of claim 10, further comprising executing the device driver in a higher privilege ring of the computing device, and wherein configuring the memory page table comprises setting a flag in the memory page table to disable memory accesses from the higher privilege ring to a lower privilege ring of the computing device.

13. The method of claim 10, wherein analyzing the device driver comprises:

matching the device driver to the reference device driver stored in a local security database; and comparing a driver fingerprint of the reference device driver to the device driver.

14. The method of claim 13, wherein comparing the driver fingerprint comprises comparing a bit mask to the memory page table associated with the device driver.

15. The method of claim 10, wherein analyzing the device driver comprises:

determining whether the device driver matches a reference device driver stored in a local security database; and generating a driver fingerprint for the device driver in response to the device driver not matching any reference driver stored in the local security database.

16. The method of claim 15, wherein analyzing the device driver comprises:

determining whether the device driver matches a reference device driver stored in the local security database; and updating, in response to the device driver not matching any reference device driver stored in the local security database, the memory page table associated with the device driver to allow the attempted cross ring memory access.

17. The method of claim 10, wherein analyzing the attempted cross ring memory access comprises comparing a destination address of the attempted cross ring memory access to security data stored in a local security database to determine whether the device driver is malicious.

18. The method of claim 17, wherein comparing the destination address of the attempted cross ring memory access comprises comparing the destination address of the attempted cross ring memory access to heuristic data of prior cross ring memory accesses to the destination address.

19. One or more non-transitory, machine readable storage media comprising a plurality of instructions stored thereon that, in response to being executed, cause a computing device to:

configure, on the computing device, a memory page table associated with the device driver to disable cross ring memory accesses by the device driver;

trap an attempted cross ring memory access by the device driver subsequent to configuration of the associated memory page table;

analyze the device driver and the attempted cross ring memory access in response to trapping the attempted cross ring memory access to determine whether the device driver is malicious, wherein to analyze the device driver comprises to compare an address of a driver fingerprint of a reference device driver to an address of the device driver from which the attempted cross ring memory access originated; and deny the attempted cross ring memory access in response to determining the device driver is malicious.

20. The one or more non-transitory, machine readable storage media of claim 19, wherein the plurality of instructions, in response to being executed, further cause the computing device to update the memory page table associated with the device driver to allow the attempted cross ring memory access in response to determining the device driver is not malicious.

21. The one or more non-transitory, machine readable storage media of claim 19, the plurality of instructions, in response to being executed, further cause the computing device to execute the device driver in a higher privilege ring of the computing device, and wherein to configure the memory page table comprises to set a flag in the memory page table to disable memory accesses from the higher privilege ring to a lower privilege ring of the computing device.

22. The one or more non-transitory, machine readable storage media of claim 19, wherein to analyze the device driver comprises to:

match the device driver to the reference device driver stored in a local security database; and compare a driver fingerprint of the reference device driver to the device driver.

23. The one or more non-transitory, machine readable storage media of claim 22, wherein to compare the driver fingerprint comprises to compare a bit mask to the memory page table associated with the device driver.

24. The one or more non-transitory, machine readable storage media of claim 19, wherein to analyze the device driver comprises to:

determine whether the device driver matches a reference device driver stored in a local security database; and generate a driver fingerprint for the device driver in response to the device driver not matching any reference driver stored in the local security database.

25. The one or more non-transitory, machine readable storage media of claim 24, wherein to analyze the device driver comprises to:

determine whether the device driver matches a reference device driver stored in the local security database; and update, in response to the device driver not matching any reference device driver stored in the local security database, the memory page table associated with the device driver to allow the attempted cross ring memory access.

26. The one or more non-transitory, machine readable storage media of claim 19, wherein to analyze the attempted cross ring memory access comprises to compare a destination address of the attempted cross ring memory access to security data stored in a local security database to determine whether the device driver is malicious.

27. The one or more non-transitory, machine readable storage media of claim 25, wherein to compare the destination address of the attempted cross ring memory access comprises to compare the destination address of the attempted cross ring memory access to heuristic data of prior cross ring memory accesses to the destination address.

* * * * *